United States Patent [19]

Nishiyama et al.

[11] Patent Number: 5,352,379
[45] Date of Patent: Oct. 4, 1994

[54] LIQUID CRYSTAL COMPOSITION, LIQUID CRYSTAL ELEMENT AND PROCESS FOR THE PREPARATION OF LIQUID CRYSTAL ELEMENT

[75] Inventors: Shinichi Nishiyama; Hideo Hama; Tooru Yamanaka, all of Sodegaura; Yukio Miyachi, Aichi, all of Japan

[73] Assignee: Mitsui Petrochemical Industries, Ltd., Tokyo, Japan

[21] Appl. No.: 894,659

[22] Filed: Jun. 5, 1992

[30] Foreign Application Priority Data

Jun. 6, 1991 [JP] Japan ................ 3-134878

[51] Int. Cl.$^5$ .............. C09K 19/32; C09K 19/30; C09K 19/12; G02F 1/13
[52] U.S. Cl. ............ 252/299.62; 252/299.63; 252/299.64; 252/299.65; 252/299.66; 252/299.67; 359/103; 359/104
[58] Field of Search ........... 252/299.01, 299.6, 299.61, 252/299.63, 299.62, 299.64, 299.65, 299.66, 299.67, 299.7; 359/103, 104

[56] References Cited

U.S. PATENT DOCUMENTS

| | | | |
|---|---|---|---|
| 4,367,924 | 1/1983 | Clark et al. | 359/103 |
| 4,576,732 | 3/1986 | Isogai et al. | 252/299.65 |
| 4,943,651 | 7/1990 | Nishiyama et al. | 252/299.62 |
| 5,053,164 | 10/1991 | Nishiyama et al. | 252/299.62 |
| 5,078,477 | 1/1992 | Jono et al. | 359/103 |
| 5,108,650 | 4/1992 | Koden et al. | 252/299.01 |
| 5,143,644 | 9/1992 | Yamaoka et al. | 252/299.62 |
| 5,246,622 | 9/1993 | Shimizu et al. | 252/299.62 |

FOREIGN PATENT DOCUMENTS

| | | |
|---|---|---|
| 0237007 | 9/1987 | European Pat. Off. |
| 0413585 | 2/1991 | European Pat. Off. |
| 0422613 | 4/1991 | European Pat. Off. |
| 0431929 | 6/1991 | European Pat. Off. |
| 56-107216 | 8/1981 | Japan |
| 59-118744 | 7/1984 | Japan |
| 643632 | 1/1989 | Japan |
| 226857 | 9/1989 | Japan |
| 240346 | 2/1990 | Japan |
| 2264746 | 10/1990 | Japan |
| 2264747 | 10/1990 | Japan |

*Primary Examiner*—Shean Wu
*Attorney, Agent, or Firm*—Sherman and Shalloway

[57] ABSTRACT

The liquid crystal composition of the present invention comprises 1-99 wt. % of an antiferroelectric liquid crystal compound such as a compound represented by the following formula [A-8] and 99-1 wt. % of a cholesteric liquid crystal compound such as a compound represented by the following formula [B-2].

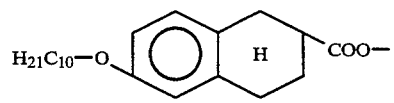

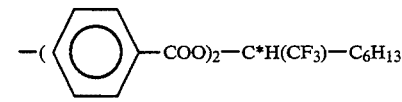

[A-8]

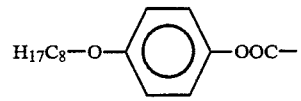

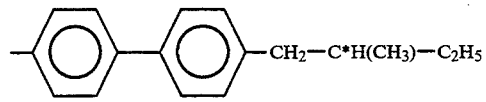

[B-2]

By the use of the liquid crystal composition of the invention, a liquid crystal element improved in liquid crystal properties such as contrast can be prepared.

14 Claims, 1 Drawing Sheet

LIQUID CRYSTAL COMPOSITION, LIQUID CRYSTAL ELEMENT AND PROCESS FOR THE PREPARATION OF LIQUID CRYSTAL ELEMENT

FIELD OF THE INVENTION

The present invention relates to a liquid crystal composition, a liquid crystal element comprising the liquid crystal composition and a process for the preparation of the liquid crystal element.

BACKGROUND OF THE INVENTION

Display devices utilizing liquid crystal compounds which are widely employed at present are usually driven by TN (twisted nematic) mode.

When the display device is driven by TN mode, however, the positions of liquid crystal compound molecules in the element of the device must be changed in order to change a displayed image. As a result, there are involved such problems that the driving time of the device becomes prolonged, and a voltage required for changing the positions of the liquid crystal compound molecules, namely, power consumption becomes large.

Switching elements using ferroelectric liquid crystal compounds, different from those in which TN mode or STN mode is utilized, are able to function only by changing the molecular orientation direction of the liquid crystal compounds, and hence the switching time is markedly shortened. Further, the value of Ps×E, which is obtained from a spontaneous polarization (Ps) of the ferroelectric liquid crystal compound and an intensity of the electric field (E), is an effective energy output for changing the molecular orientation direction of the liquid crystal compounds, and accordingly the power consumption is also significantly diminished. Such ferroelectric liquid crystal compounds as mentioned above have two stable states, namely, bistability, in accordance with the direction of the applied electric field, and therefore show significantly excellent switching threshold value characteristics. Accordingly, the ferroelectric liquid crystal compounds are particularly suitable for display devices for animations.

Antiferroelectric liquid crystals also have the above-mentioned excellent characteristics, and in addition, they show easy realization of memory and high contrast. Accordingly, the antiferroelectric liquid crystals are also particularly suitable for display devices.

As the antiferroelectric liquid crystals (also referred to as "AFLC" for short hereinafter), there have been so far reported a liquid crystal MHPOBC (abbreviation for [4-(1-methylheptyloxycarbonylphenyl)4'-octyloxybiphenyl-4'-carboxylate], etc.

However, the conventionally known antiferroelectric liquid crystals are insufficient in the orientation characteristics when practically used for display devices.

For enhancing the orientation characteristics of the aforementioned ferroelectric liquid crystal, molecules of the ferroelectric liquid crystal are arranged in such a manner that the liquid crystal is in a cholesteric phase on the high temperature side where the molecules can be freely orientated, and that the liquid crystal phase is changed to be Iso (liquid phase)-Ch (cholesteric phase)-SmC* (chiral smectic phase) as the temperature is changed from a high temperature to a low temperature to make the initial orientation directions of the molecules almost the same. As a result, high orientation of the ferroelectric liquid crystal molecules can be achieved.

As for the antiferroelectric liquid crystals (AFLC), however, no liquid crystal showing phase change of Iso-Ch-(SmA)-SmC$_A$* (AFLC phase) in accordance with lowering of a temperature has been found yet.

OBJECT OF THE INVENTION

An object of the present invention is to provide a liquid crystal composition capable of producing display devices having excellent characteristics such as high orientation characteristics of a liquid crystal contained therein, easy orientation of the liquid crystal, an especially wide operating temperature range, a high switching speed, an appropriate switching threshold voltage, an extremely small amount of power consumption, and a high contrast.

Another object of the present invention is to provide a liquid crystal element comprising the above-mentioned liquid crystal composition and a process for the preparation of the liquid crystal element.

SUMMARY OF THE INVENTION

The liquid crystal composition of the present invention comprises at least one kind of a compound which shows an antiferroelectric phase and at least one kind of a compound which shows a cholesteric phase.

In the liquid crystal composition, a carboxylic acid ester compound represented by the following formula [A] is preferably contained as the compound which shows an antiferroelectric phase.

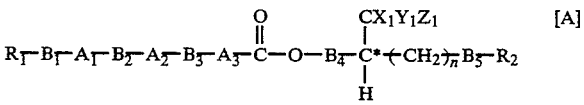

In the formula [A], $R_1$ is an alkyl group of 3–20 carbon atoms or a halogenated alkyl group of 3–20 carbon atoms; $B_1$, $B_2$, $B_3$ and $B_5$ are each independently a group selected from the group consisting of —O—, —COO—, —OCO—, —CH$_2$—CH$_2$—, —CH=CH—, —CH$_2$O—, —OCH$_2$—, —S—S—, —S—, —CO—CH$_2$—, —CH$_2$—CO—, —NH—CO—, —CO—NH—, —CH=N—, —N=CH—, —NH—, —CO—, —NH—NH—, —NH—CH$_2$— and —CH$_2$—NH—, or a single bond; $B_4$ is —(CH$_2$)$_w$— wherein w is an integer of 0 to 3; $A_1$, $A_2$ and $A_3$ are each independently a group selected from the group consisting of

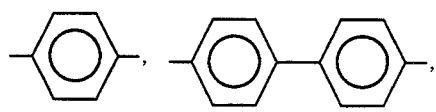

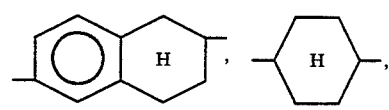

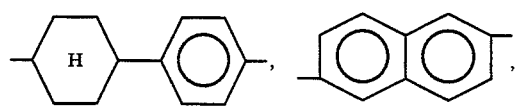

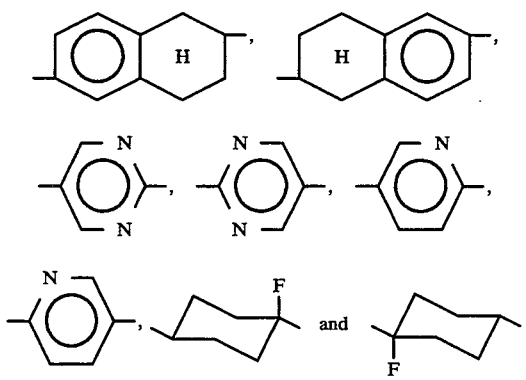

or a single bond and $A_1$, $A_2$ and $A_3$ may be substituted by a halogen such as fluorine and chlorine or a lower alkyl group such as methyl or ethyl; $X_1$, $Y_1$ and $Z_1$ are each independently a hydrogen atom or a halogen atom; n is an integer of 0 to 4; and $R_2$ is an alkyl group of 1–20 carbon atoms.

In the liquid crystal composition, a compound represented by the following formula [B] is preferably contained as the compound which shows a cholesteric phase.

[B]

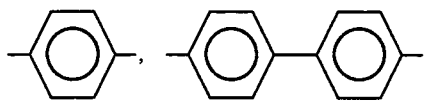

In the formula [B], $R_3$ is an alkyl group of 3–20 carbon atoms or a halogenated alkyl group of 3–20 carbon atoms; $B_6$ is —O— or a single bond; $B_7$, $B_8$ and $B_9$ are each independently —COO—, —OCO— or a single bond; $A_4$ and $A_5$ are each independently a group selected from the group consisting of

or a single bond; m is an integer of 1 to 3; and $R_4$ is an alkyl group of 2–5 carbon atoms.

By the use of the liquid crystal composition of the invention, there can be obtained display devices having excellent characteristics such as high orientation characteristics of the liquid crystal contained therein, easy orientation of the liquid crystal, an especially wide operating temperature range, a high switching speed, an appropriate switching threshold voltage, an extremely small amount of power consumption, and a high contrast.

DETAILED DESCRIPTION OF THE INVENTION

Figure 1:
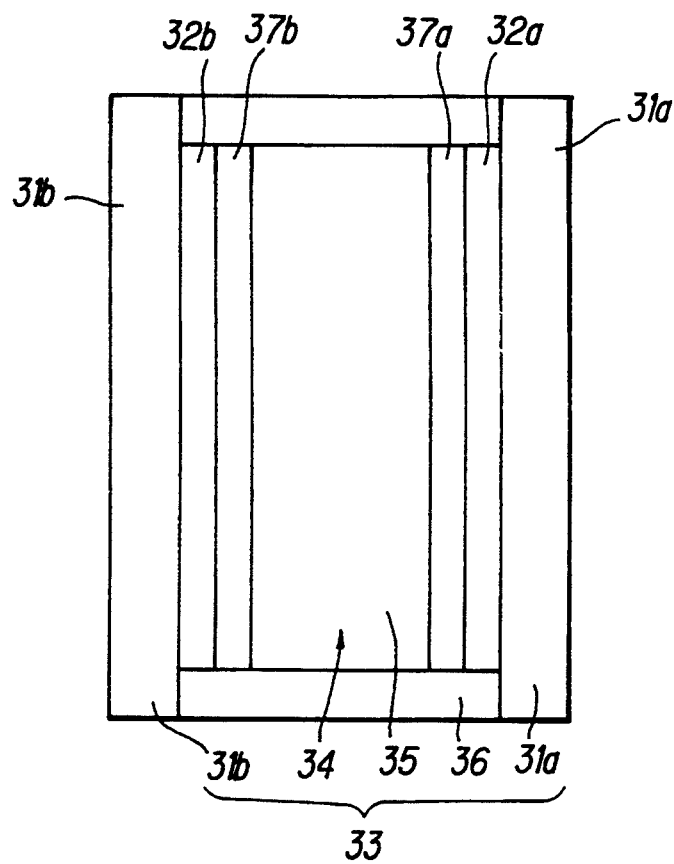
FIG. 1 is a diagram schematically showing one embodiment of the liquid crystal element according to the invention.

The liquid crystal composition of the present invention and uses of the composition are described below in detail.

In the liquid crystal composition of the invention, at least one kind of a compound in an antiferroelectric phase and at least one kind of a compound in a cholesteric phase are contained.

As the liquid crystal (compound) in an antiferroelectric phase, there are, for example, the aforementioned MHPOBC compound, a carboxylic acid ester compound represented by the following formula [A] and compounds represented by the following formulas:

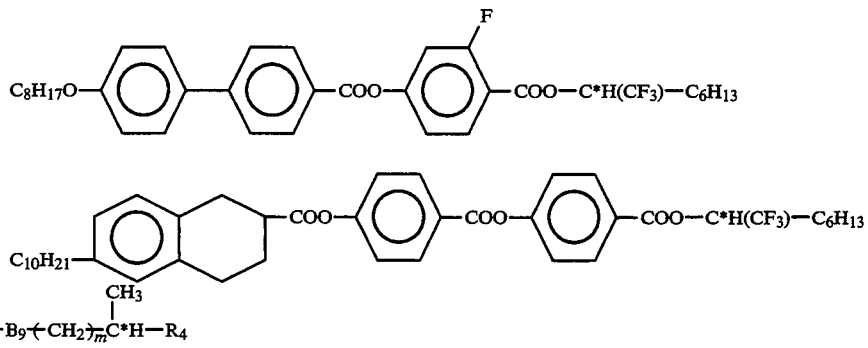

In the liquid crystal composition, it is preferred that at least one kind of a carboxylic acid ester compound represented by the following formula [A] is contained as the antiferroelectric liquid crystal. The carboxylic acid ester compound represented by the formula [A] is also referred to as "Compound [A]" hereinafter.

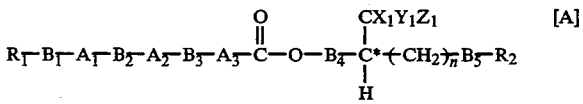

In the formula [A], $R_1$ is an alkyl group of 3–20 carbon atoms, preferably an alkyl group of 6–16 carbon atoms, or a halogenated alkyl group of 3–20 carbon atoms, preferably a halogenated alkyl group of 6–16 carbon atoms.

When $R_1$ in the formula [A] is an alkyl group of 3–20 carbon atoms, the alkyl group may be either a straight-chain form, a branched form or an allcyclic form. A carboxylic acid ester molecule with $R_1$ of a straight-chain alkyl group, however, exhibits excellent liquid crystal properties due to the linearly extended rigid straight structure of the molecule. Concrete examples of the straight-chain alkyl group include hexyl, heptyl, octyl, nonyl, decyl, undecyl, dodecyl, tetradecyl, hexadecyl and octadecyl.

When $R_1$ is a halogenated alkyl group of 3-20 carbon atoms, an example of such halogenated alkyl group is a group obtained by substituting at least a part of hydrogen atoms of the above-mentioned alkyl group with halogen atoms such as F, Cl, Br and I.

$B_1$, $B_2$, $B_3$ and $B_5$ are each independently a group selected from the group consisting of —O—, —COO—, —OCO—, —CH$_2$—CH$_2$—, —CH=CH—, —CH$_2$O—, —OCH$_2$—, —S—S—, —S—, —CO—CH$_2$—, —CH$_2$—CO—, —NH—CO—, —CO—NH—, —CH=N—, —N=CH—, —NH—, —CO—, —NH—NH—, —NH—CH$_2$— and —CH$_2$—NH—, or a single bond. Of these, each of $B_1$ and $B_5$ preferably is any of —O—, —COO—, —OCO—, —CO— and a single bond, and each of $B_2$ and $B_3$ preferably is any of —O—, —COO—, —OCO—, —CH$_2$—CH$_2$—, —CH$_2$O—, —OCH$_2$— and a single bond. More preferably, $B_1$ is —O— or a single bond, each of $B_2$ and $B_3$ is any of —COO—, —OCO— and —CH$_2$—CH$_2$—, and $B_5$ is —COO—, —OCO— or a single bond. When each of $B_1$, $B_2$, $B_3$ and $B_5$ is such a group as above or a single bond, a liquid crystal composition exhibiting high orientation characteristics can be obtained.

$B_4$ is —(CH$_2$)$_w$— (wherein w is an integer of 0 to 3). As $B_4$, preferred is —(CH$_2$)— or a single bond (w=0).

$A_1$, $A_2$ and $A_3$ are each independently a group selected from the group consisting of

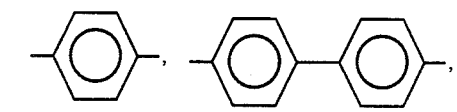

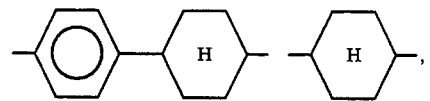

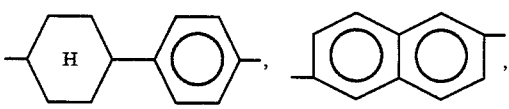

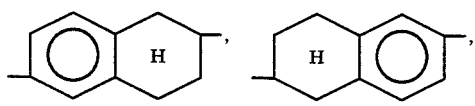

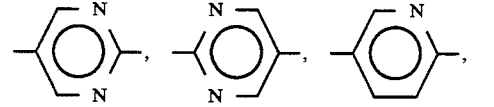

and

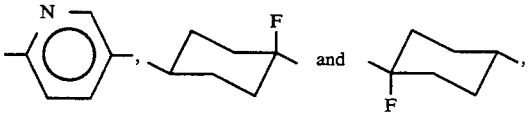

or a single bond. Of these, preferred are the following groups and a single bond.

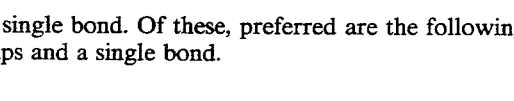

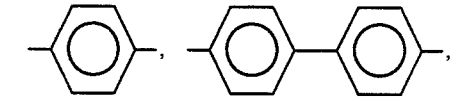

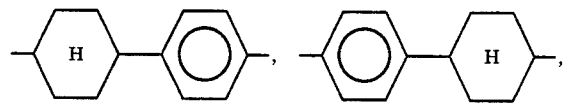

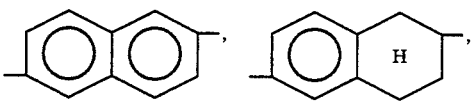

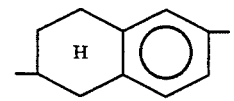

More preferably, $A_1$ and $A_2$ are each independently a group selected from the group consisting of

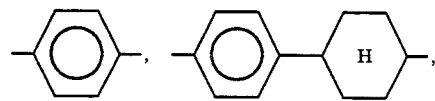

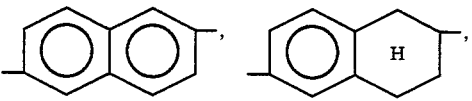

and

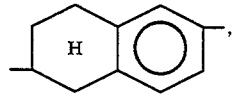

and $A_3$ is a group selected from the group consisting of

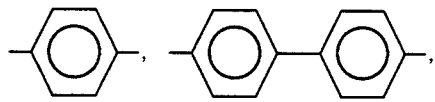

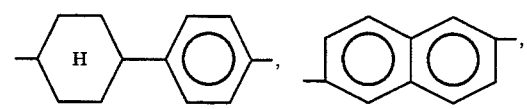

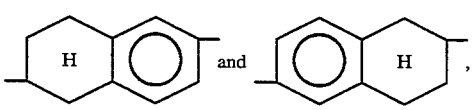

Especially when $A_1$ is

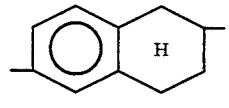

and each of $A_2$ and $A_3$ is

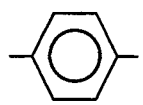

a liquid crystal composition showing excellent properties (e.g., high contrast) can be obtained.

These $A_1$, $A_2$ and $A_3$ may be substituted by a halogen atom such as fluorine and chlorine or a lower alkyl group such as methyl or ethyl.

$X_1$, $Y_1$ and $Z_1$ are each independently a hydrogen atom or a halogen atom, and it is preferred in the invention that all of $X_1$, $Y_1$ and $Z_1$ are hydrogen atoms or all of $X_1$, $Y_1$ and $Z_1$ are halogen atoms.

n is an integer of 0 to 4, preferably 0 or 1.

$R_2$ is an alkyl group of 1-20 carbon atoms, preferably an alkyl group of 1-10 carbon atoms.

Concrete examples of the carboxylic acid ester compounds showing anitferroelectricity which are represented by the formula [A] include compounds described in Japanese Patent Provisional Publications No. 1(1989)-226857, No. 2(1990)-40346, No. 2(1990)-264746 and No. 2(1990)-264747 and compounds indicated by Compound Nos. [A-1] to [A-55] set forth in Table 1. The antiferroelectric carboxylic acid ester compounds also include compounds which are different from each other only in the length of terminal alkyl chain, such as the compounds indicated by Compound Nos. [A-5] to [A-11] in Table 1.

Each symbols in Table 1 have the same meanings as defined in the compound [A].

Further, each abbreviations in the symbols $A_1$, $A_2$ and $A_3$ have the following meanings.

p-Ph:

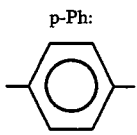

Bi-Ph:

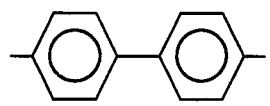

Ph-Cyh:

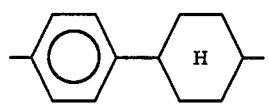

Cyh:

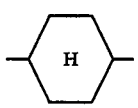

Nap:

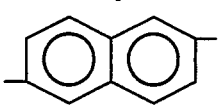

Tet:

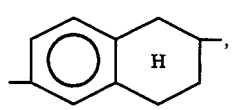

Rte:

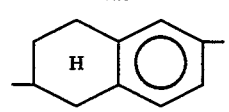

Cyh-Ph:

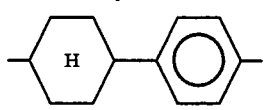

TABLE 1

| Compound Number | $R_1$ $C_pH_q-$ | | $B_1$ | $A_1$ | $B_2$ | $A_2$ | $B_3$ | $A_3$ | $B_4$ $(CH_2)w$ w | $X_1$, $Y_1$, $Z_1$ | n | $B_5$ | $R_2$ $-C_rH_s$ | |
|---|---|---|---|---|---|---|---|---|---|---|---|---|---|---|
| | p | q | | | | | | | | | | | r | s |
| A-1 | 10 | 21 | O | Tet | —COO— | p-Ph | — | — | 0 | F | 0 | — | 6 | 13 |
| A-2 | 10 | 21 | — | Tet | —COO— | p-Ph | — | — | 0 | F | 0 | — | 6 | 13 |
| A-3 | 10 | 21 | O | Tet | —COO— | p-Ph | — | — | 0 | H | 0 | — | 6 | 13 |
| A-4 | 10 | 21 | — | Tet | —COO— | p-Ph | — | — | 0 | H | 0 | — | 6 | 13 |
| A-5 | 7 | 15 | O | Tet | —COO— | p-Ph | —COO— | p-Ph | 0 | F | 0 | — | 6 | 13 |
| A-6 | 8 | 17 | O | Tet | —COO— | p-Ph | —COO— | p-Ph | 0 | F | 0 | — | 6 | 13 |
| A-7 | 9 | 19 | O | Tet | —COO— | p-Ph | —COO— | p-Ph | 0 | F | 0 | — | 6 | 13 |
| A-8 | 10 | 21 | O | Tet | —COO— | p-Ph | —COO— | p-Ph | 0 | F | 0 | — | 6 | 13 |
| A-9 | 11 | 23 | O | Tet | —COO— | p-Ph | —COO— | p-Ph | 0 | F | 0 | — | 6 | 13 |
| A-10 | 12 | 25 | O | Tet | —COO— | p-Ph | —COO— | p-Ph | 0 | F | 0 | — | 6 | 13 |
| A-11 | 16 | 33 | O | Tet | —COO— | p-Ph | —COO— | p-Ph | 0 | F | 0 | — | 6 | 13 |
| A-12 | 10 | 21 | O | Tet | —COO— | p-Ph | —COO— | p-Ph | 1 | H | 0 | — | 2 | 5 |
| A-13 | 10 | 21 | — | Tet | —COO— | p-Ph | —COO— | p-Ph | 1 | H | 0 | — | 2 | 5 |
| A-14 | 10 | 21 | O | Tet | —COO— | p-Ph | —COO— | p-Ph | 3 | H | 0 | — | 2 | 5 |
| A-15 | 10 | 21 | — | Tet | —COO— | p-Ph | —COO— | p-Ph | 3 | H | 0 | — | 2 | 5 |
| A-16 | 10 | 21 | O | Tet | —COO— | p-Ph | —COO— | p-Ph | 0 | H | 0 | — | 6 | 13 |
| A-17 | 10 | 21 | — | Tet | —COO— | p-Ph | —COO— | p-Ph | 0 | H | 0 | — | 6 | 13 |
| A-18 | 10 | 21 | O | Tet | —COO— | Tet | — | — | 0 | F | 0 | — | 6 | 13 |
| A-19 | 10 | 21 | — | Tet | —COO— | Tet | — | — | 0 | F | 0 | — | 6 | 13 |
| A-20 | 10 | 21 | O | Tet | —COO— | Tet | — | — | 0 | H | 0 | — | 6 | 13 |
| A-21 | 10 | 21 | — | Tet | —COO— | Tet | —COO— | p-Ph | 0 | H | 0 | — | 6 | 13 |
| A-22 | 7 | 15 | O | Nap | —COO— | Tet | — | — | 0 | F | 0 | — | 6 | 13 |
| A-23 | 7 | 15 | — | Nap | —COO— | Tet | — | — | 0 | F | 0 | — | 6 | 13 |
| A-24 | 7 | 15 | O | Nap | —COO— | Tet | — | — | 0 | H | 0 | — | 6 | 13 |
| A-25 | 7 | 15 | — | Nap | —COO— | Tet | — | — | 0 | H | 0 | — | 6 | 13 |
| A-26 | 10 | 21 | O | Rte | —COO— | p-Ph | —COO— | p-Ph | 0 | F | 0 | — | 6 | 13 |
| A-27 | 10 | 21 | — | Rte | —COO— | p-Ph | —COO— | p-Ph | 0 | F | 0 | — | 6 | 13 |

TABLE 1-continued

| Compound Number | R₁ $C_pH_q$— p | q | B₁ | A₁ | B₂ | A₂ | B₃ | A₃ | B₄ (CH₂)w w | X₁, Y₁, Z₁ | n | B₅ | R₂ —CrHs r | s |
|---|---|---|---|---|---|---|---|---|---|---|---|---|---|---|
| A-28 | 10 | 21 | O | Rte | —COO— | p-Ph | —COO— | p-Ph | 0 | H | 0 | — | 6 | 13 |
| A-29 | 10 | 21 | — | Tet | —COO— | p-Ph | —COO— | p-Ph | 0 | H | 0 | — | 6 | 13 |
| A-30 | 10 | 21 | O | Rte | —COO— | p-Ph | — | — | 0 | F | 0 | — | 6 | 13 |
| A-31 | 10 | 21 | — | Rte | —COO— | p-Ph | — | — | 0 | F | 0 | — | 6 | 13 |
| A-32 | 10 | 21 | O | Rte | —COO— | p-Ph | — | — | 0 | H | 0 | — | 6 | 13 |
| A-33 | 10 | 21 | O | Rte | —COO— | p-Ph | — | — | 0 | H | 0 | — | 6 | 13 |
| A-34 | 7 | 15 | O | Nap | —COO— | p-Ph | — | — | 0 | F | 0 | — | 6 | 13 |
| A-35 | 10 | 21 | O | Nap | —COO— | p-Ph | — | — | 0 | F | 0 | — | 6 | 13 |
| A-36 | 16 | 33 | O | Nap | —COO— | p-Ph | — | — | 0 | F | 0 | — | 6 | 13 |
| A-37 | 10 | 21 | — | Nap | —COO— | p-Ph | — | — | 0 | F | 0 | — | 6 | 13 |
| A-38 | 10 | 21 | O | Nap | —COO— | p-Ph | — | — | 0 | H | 0 | — | 6 | 13 |
| A-39 | 10 | 21 | — | Nap | —COO— | p-Ph | — | — | 0 | H | 0 | — | 6 | 13 |
| A-40 | 10 | 21 | O | Nap | —COO— | p-Ph | — | — | 0 | F | 0 | — | 6 | 13 |
| A-41 | 10 | 21 | — | Nap | —COO— | Ph—Cyh | — | — | 0 | F | 0 | — | 6 | 13 |
| A-42 | 10 | 21 | O | Nap | —COO— | Bi—Ph | — | — | 0 | F | 0 | — | 6 | 13 |
| A-43 | 10 | 21 | — | Nap | —COO— | Bi—Ph | — | — | 0 | F | 0 | — | 6 | 13 |
| A-44 | 10 | 21 | O | Ph—Cyh | —COO— | Bi—Ph | — | — | 0 | F | 0 | — | 6 | 13 |
| A-45 | 10 | 21 | — | Ph—Cyh | —COO— | Bi—Ph | — | — | 0 | F | 0 | — | 6 | 13 |
| A-46 | 10 | 21 | O | Ph—Cyh | —COO— | p-Ph | — | — | 0 | F | 0 | — | 6 | 13 |
| A-47 | 10 | 21 | — | Ph—Cyh | —COO— | p-Ph | — | — | 0 | F | 0 | — | 6 | 13 |
| A-48 | 10 | 21 | O | Ph—Cyh | —COO— | p-Ph | — | — | 0 | F | 1 | COO | 2 | 5 |
| A-49 | 10 | 21 | — | Ph—Cyn | —COO— | p-Ph | — | — | 0 | F | 1 | COO | 2 | 5 |
| A-50 | 10 | 21 | O | Ph—Cyh | —COO— | Ph—Cyh | — | — | 0 | F | 0 | — | 6 | 13 |
| A-51 | 10 | 21 | — | Ph—Cyh | —COO— | Ph—Cyh | — | — | 0 | F | 0 | — | 6 | 13 |
| A-52 | 10 | 21 | O | Ph—Cyh | —COO— | Bi—Ph | — | — | 0 | F | 0 | — | 6 | 13 |
| A-53 | 10 | 21 | — | Ph—Cyh | —COO— | Bi—Ph | — | — | 0 | F | 0 | — | 6 | 13 |
| A-54 | 10 | 21 | O | p-Ph | (CH₂)₂ | p-Ph | — | — | 1 | H | 0 | — | 2 | 5 |
| A-55 | 10 | 21 | — | p-Ph | (CH₂)₂ | p-Ph | — | — | 1 | H | 0 | — | 2 | 5 |

Such carboxylic acid ester compounds as described above can be prepared utilizing known synthetic techniques in combination.

For example, the carboxylic acid ester compounds can be synthesized through the synthetic route as illustrated below.

In the compound shown in the following synthetic route, R is an alkyl group of 3-20 carbon atoms or a halogenated alkyl group of 3-20 carbon atoms. R* is an optically active group of 4-20 carbon atoms having at least one asymmetric carbon atom. Hydrogen atoms which are bonded to the carbon atoms of the optically active group may be substituted with halogen atoms such as F, Cl, Br and I, preferably a fluorine atom. Examples of such optically active groups include —C*H(CH₃)—C₆H₁₃, —C*H(CH₃)—C₅H₁₁, —C*H(C₂H₅)—C₅H₁₁, —C*H(C₂H₅)—C₆H₁₃, —C*H(CF₃)—C₆H₁₃ and —C*H(CF₃)—CH₂—COO—C₂H₅.

Synthetic route

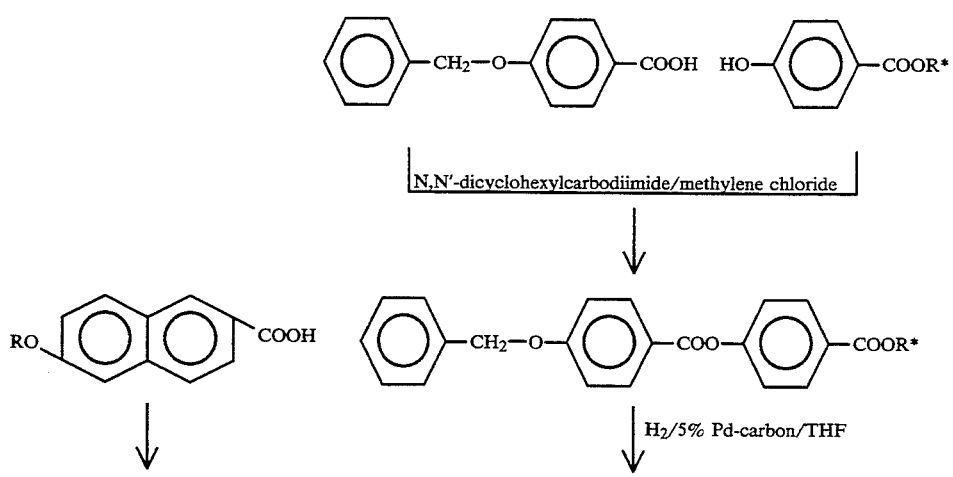

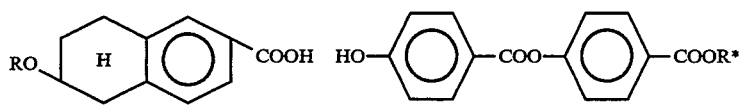

N,N'-dicyclohexylcarbodiimide/methylene chloride

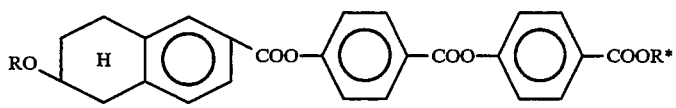

That is to say, for example, 6-n-alkoxynaphthalene-2-carboxylic acid is hydrogenated under application of heat and pressure in the presence of palladium/carbon catalyst, to obtain 5,6,7,8-tetrahydro-6-n-alkoxynaphthalene-2-carboxylic acid.

Separately, 4-hydroxybenzoate which is derived from an optically active alcohol is caused to react with 4-benzyloxy benzoic acid in a mixture solvent of 4-N,N-dimethylaminopyridine and methylene chloride while a N,N'-dicyclohexylcarbodiimide solution is added dropwise, to obtain 4-(4'-benzyloxybenzoyloxy)benzoate which is derived from the optically active alcohol.

The resulting 4-(4'-benzyloxybenzoyloxy)benzoate which is derived from the optically active alcohol is introduced into a solvent such as tetrahydrofuran, and reduced using hydrogen gas in the presence of a reduction catalyst such as palladium/carbon, to obtain 4-(4'-hydroxybenzoyloxy)benzoate which is derived from optically active alcohol.

Thus obtained 4-(4'-hydroxybenzoyloxy)benzoate which is derived from the optically active alcohol is caused to react with the 5,6,7,8-tetrahydro-6-n-alkoxynaphthalene-2-carboxylic acid obtained in the above stage in a mixture solvent of 4-N,N-dimethylaminopyridine and methylene chloride while a N,N'-dicyclohexylcarbodiimide solution is added dropwise, to obtain a carboxylic acid ester compound according to the invention.

The above-mentioned process is given as an example of processes for preparing antiferroelectric liquid crystals (carboxylic acid ester compounds [A]) used in the invention, and it should be construed that a process for preparing the carboxylic acid ester compounds [A] used in the invention are by no means limited to this process.

The carboxylic acid ester compound having the formula [A] prepared as above are used as an antiferroelectric liquid crystal compound.

The carboxylic acid ester compound, particularly a compound indicated by the above-mentioned Compound No. [A-8], is mixed to a cholesteric liquid crystal compound (described later), whereby a liquid crystal composition remarkably enhanced in the liquid crystal properties such as contrast (i.e., orientation properties) can be obtained.

The liquid crystal composition of the invention contains at least one kind of a compound which shows a cholesteric phase (i.e., cholesteric liquid crystal compound), as described before. That is, in the liquid crystal composition of the invention, at least one kind of the above-mentioned antiferroelectric liquid crystal compound and at least one kind of a cholesteric liquid crystal compound are contained, so that the composition exhibits phase change of Iso (isotropic phase)-Ch (cholesteric phase)-(SmA (smectic A phase))-SmC$_A$* (antiferroelectric phase, AFLC phase) in accordance with lowering of a temperature, or is enhanced in the orientation properties of the liquid crystal.

Moreover, by the use of the liquid crystal composition, there can be obtained display devices having excellent characteristics such as high orientation properties of the liquid crystal contained therein, easy orientation of the liquid crystal, an especially wide operating temperature range, a high switching speed, an appropriate switching threshold voltage, an extremely small amount of power consumption, and a high contrast.

Examples of the cholesteric liquid crystal compounds include compounds represented by the following formulas

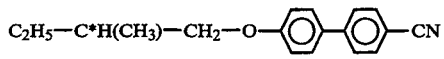

and a compound represented by the following formula [B]. Particularly, the compound represented by the formula [B] (also referred to as "Compound [B]" hereinafter) is preferably contained in the liquid crystal composition of the invention.

Compound [B]

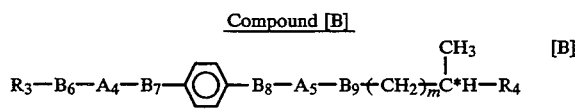

In the formula [B], R$_3$ is an alkyl group of 3–20 carbon atoms, preferably an alkyl group of 6–18 carbon atoms, or a halogenated alkyl group of 3–20 carbon atoms, preferably a halogenated alkyl group of 6–18 carbon atoms; B$_6$ is —O— or a single bond; B$_7$, B$_8$ and B$_9$ are each independently —COO—, —OCO— or a single bond; A$_4$ and A$_5$ are each independently a group selected from the group consisting of

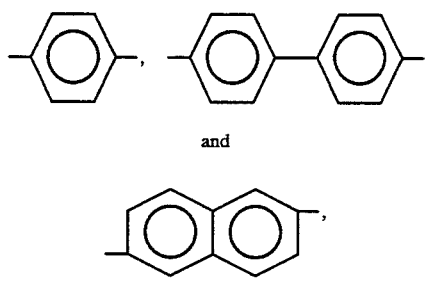

and or a single bond; m is an integer of 1 to 3; and $R_4$ is an alkyl group of 2–5 carbon atoms.

Concrete examples of the compound [B] are set forth in Table 2. Each abbreviations shown in Table 2 have the same meanings as those in Compound [A].

TABLE 2

| Compound | $R_3$ $C_pH_q$— | | | | | | | | $(CH_2)_m$ | $R_4$ —$CrHs$ | |
|---|---|---|---|---|---|---|---|---|---|---|---|
| Number | p | q | $B_6$ | $A_4$ | $B_7$ | $B_8$ | $A_5$ | $B_9$ | m | r | s |
| B-1 | 8 | 17 | O | — | — | —OOC— | Bi—Ph | — | 1 | 2 | 5 |
| B-2 | 10 | 21 | O | — | — | —OCO— | Nap | —COO— | 1 | 2 | 5 |
| B-3 | 7 | 15 | O | — | — | —OCO— | p-Ph | —O— | 3 | 2 | 5 |
| B-4 | 10 | 21 | O | — | — | —COO— | p-Ph | —O— | 3 | 2 | 5 |

Phase transition temperatures of a particularly preferred liquid crystal composition containing the antiferroelectric liquid crystal compound (preferably Compound [A]) and the cholesteric liquid crystal compound (preferably Compound [B]) are set forth in Table 3.

In Table 3, phase transition temperatures of Compound [A] (Compound No. [A-8]) and Compound [B] (Compound No. [B-1]) are also set forth.

As is apparent from Table 3, in the liquid crystal composition of the invention, physical properties inherently belonging to each of Compound [A] and Compound [B] entirely disappear, and the phase transition temperatures of the liquid crystal composition are completely different from those of Compound [A] or Compound [B]. This means that the liquid crystal composition of the invention is not a mixture in which Compound [A] and compound [B] in the form of liquid crystal are simply mixed but a homogeneous mixture. Such homogeneous mixture can be prepared, for example, by a process as described in Example 1.

In the tables given hereinafter, Cry, SmC$_A$*, SmA, Ch and Iso denote a crystal phase, an antiferroelectric phase, a smectic A phase, a cholesteric phase and an isotropic liquid, respectively.

ments much more improved in the liquid crystal orientation and the electrooptic response speed, as compared with the case of using the antiferroelectric liquid crystal alone.

The amount of the antiferroelectric liquid crystal compound, preferably a liquid crystal compound represented by the formula [A], contained in the liquid crystal composition is determined in consideration of properties of the used compound, viscosity of the composition, operating temperature range thereof, uses thereof, etc. The amount thereof generally is in the range of 1 to 99 parts by weight, preferably 5 to 95 parts by weight, more preferably 15 to 85 parts by weight, per 100 parts by weight of the liquid crystal composition. When the amount of Compound [A] is within the above range, the obtained composition maintains antiferroelectricity and is improved in the orientation properties. When the amount of Compound [A] is less than 1 part by weight, the obtained composition tends to exhibit no antiferroelectricity. When the amount thereof exceeds 99 parts by weight, the obtained composition is not improved in the orientation properties.

The amount of the cholesteric liquid crystal compound represented by the formula [B] contained in the liquid crystal composition of the invention generally is in the range of 1 to 99 parts by weight, preferably 5 to 95 parts by weight, more preferably 15 to 85 parts by weight, per 100 parts by weight of the liquid crystal composition. When the amount of Compound [B] is within the above range, the obtained composition exhibits antiferroelectricity and is improved in the orientation properties. Therefore, liquid crystal elements comprising the composition show excellent contrast.

Liquid crystal compositions having antiferroelectricity such as the liquid crystal composition of the invention show an optical switching phenomenon when an electric field or a magnetic field is applied thereto as in the case of ferroelectric liquid crystals. Accordingly, display devices having a good response can be prepared by utilizing this phenomenon, as described in Japanese Patent Provisional Publication No. 56(1981)-107216 and No. 59(1984)-118744.

TABLE 3

| | Phase Transition Temperature | | | |
|---|---|---|---|---|
| | Cry—SmC$_A$* or | | SmC$_A$*—Ch or | SmA—Iso or |
| Compound | Cry—SmA | SmC$_A$*—SmA | SmA—Ch | Ch—Iso |
| [A-8] | 44° C. | 78° C. | | 94° C. |
| [A-8] (10 wt. %) + [B-1] (90 wt. %) | 40° C. | 69° C. | 80° C. | 149° C. |
| [B-1] | 76° C. | | 89° C. | 155° C. |

Note: Compound [A-8] and Compound [B-1] are compounds represented by the following formulas.

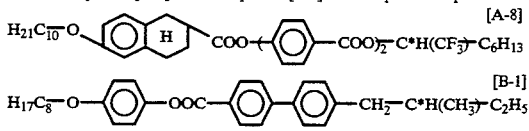

In the case of using the liquid crystal composition of the invention, there can be obtained liquid crystal ele- The ferroelectric liquid crystal compounds conventionally used in the display devices utilizing the optically switching phenomenon exist in a chiral smectic C phase, a chiral smectic F phase, a chiral smectic G phase, a chiral smectic H phase, a chiral smectic I phase, a chiral smectic J phase or a chiral smectic K phase. However, display elements comprising such liquid crystal compounds other than those in a chiral smectic C phase (SmC* phase) generally show a slow response speed. Therefore, driving of a liquid crystal element comprising a liquid crystal compound in a chiral smectic C phase has been considered effective from the practical standpoint.

The liquid crystal composition of the present invention, however, can be used not only in an antiferroelectric chiral smectic C phase (SmC*$_A$) but also in a smectic A phase by utilizing such a method for driving a display device comprising a liquid crystal material in a smectic A phase as having been already proposed by the present inventors in Japanese Patent Provisional Publication No. 64(1989)-3632, and this is the same as for the ferroelectric liquid crystal composition which can be used not only in a chiral smectic C phase (SmC*) but also in a smectic A phase. A method for driving a liquid crystal element comprising the liquid crystal composition of the invention will be described later.

The liquid crystal composition of the invention may further contain other liquid crystal compounds in addition to the above-mentioned essential components of the antiferroelectric liquid crystal and the cholesteric liquid crystal.

Examples of such liquid crystal compounds employable in combination with the above-mentioned essential components are as follows.

(+)-4'-(2''-methylbutyloxy)phenyl-6-octyloxynaphthalene-2-carboxylate,

4'-decyloxyphenyl-6-((+)-2''-methylbutyloxy)naphthalene-2-carboxylate,

Liquid crystal compounds such as

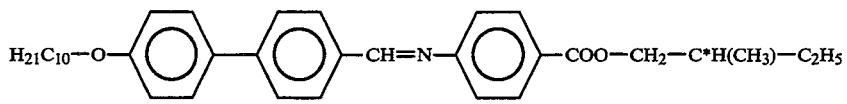

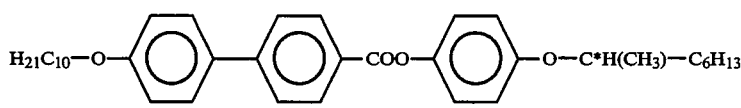

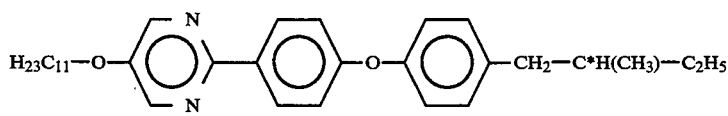

Schiff base liquid crystal compounds such as

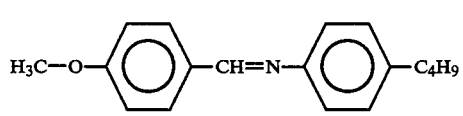

Azoxy liquid crystal compounds such as

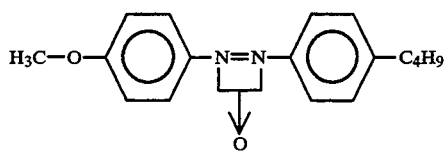

Benzoic acid ester liquid crystal compounds such as

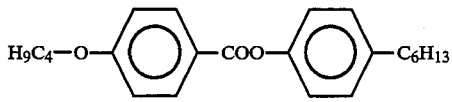

and

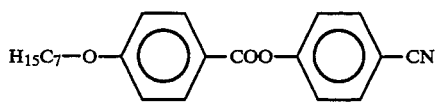

Cyclohexylcarboxylic acid ester liquid crystal compounds such as

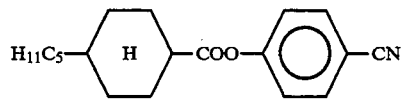

and

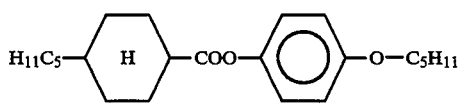

Biphenyl liquid crystal compounds such as

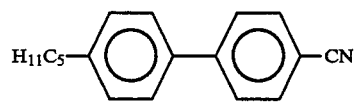

Terphenyl liquid crystal compounds such as

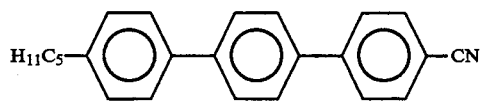

Cyclohexyl liquid crystal compounds such as

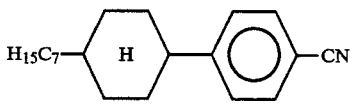

and

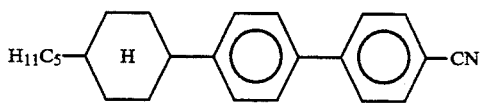

Pyrimidine liquid crystal compounds such as

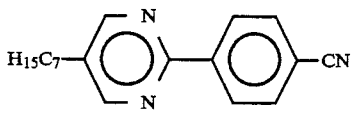

The liquid crystal composition of the invention may also contain other additives which can be added to the conventional liquid crystal compositions, such as electroconductivity-imparting agents and life-extending agents.

When the liquid crystal composition of the invention is used for a liquid crystal element which is driven utilizing dichroism of dyes, the composition may contain dichroic dyes.

The liquid crystal composition of the invention can be prepared by mixing the antiferroelectric liquid crystal with the cholesteric liquid crystal, and if desired, other liquid crystal compounds and additives can be added.

Liquid Crystal Element

A liquid crystal element comprising the above-mentioned liquid crystal composition as a liquid crystal material is described below.

Figure 2:
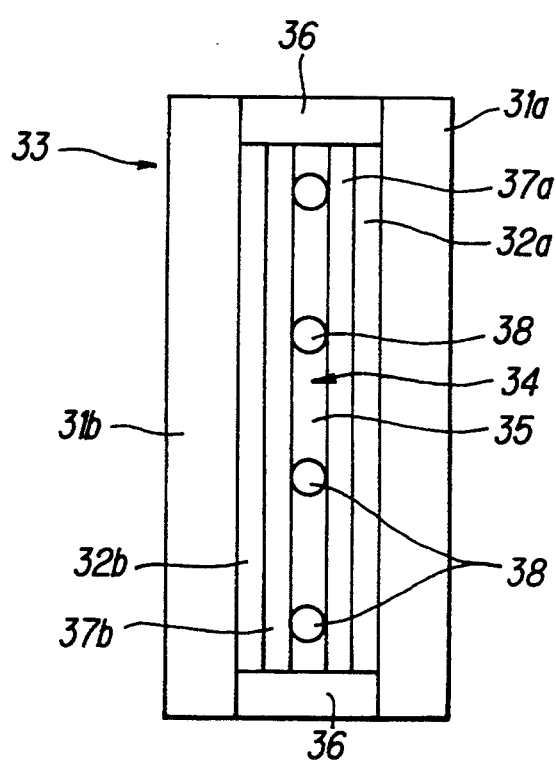
FIG. 2 is a diagram schematically showing another embodiment of the liquid crystal element according to the invention.

FIG. 1 and FIG. 2 are sectional diagrams showing embodiments of the liquid crystal element of the present invention. The same symbols in those figures indicate the same part.

The liquid crystal element of the invention basically comprises, as shown in FIG. 1 as an example, a cell 33 including two substrates 31a, 31b facing each other and having a gap 34 therebetween, and a liquid crystal material 35 filled in the gap. That is to say, the liquid crystal element of the invention basically comprises a cell 33 composed of two substrates 31a, 31b (also referred to as simply "substrate(s)" so arranged as to form a gap 34 therebetween and a liquid crystal material 35 filled in the gap 34.

At least one of the substrates 31a, 31b is required to be transparent, and examples of the substrate materials include glass, transparent plastics (e.g., polycarbonate and TPX (4-methyl-1-pentene polymer or copolymer)) and amorphous polyolefins (e.g., copolymer of ethylene and tetracyclo[4,4,0,1$^{2.5}$, 1$^{7.10}$]3-dodecene) .

In the invention, flexible transparent substrates such as various polymer films can be also employed as the transparent substrates, in addition to the above-mentioned glass substrates and plastic substrates.

In the case of using a glass substrate, an undercoat layer (i.e., a layer for preventing permeation of unnecessary components) comprising silicon oxide, etc. as the major component may be provided on the surface of the glass substrate to prevent deterioration of the liquid crystal material caused by elution of an alkali component of the substrate.

The transparent substrate has a thickness of usually 0.01 to 1.2 mm when it is a glass substrate.

On the inner sides of the substrates 31a, 31b (i.e., sides facing the liquid crystal material), electrodes 32a, 32b made of indium tin oxide, etc. are provided. In the invention, a transparent electrode substrate in which a transparent electrode is united to the above-mentioned substrate can be also employed as the substrate.

The transparent electrode can be formed by coating the transparent substrate surface with, for example, indium oxide or tin oxide.

The transparent electrode has a thickness of usually 100 to 2,000 Å.

In the liquid crystal element of the invention, an orientation control film (i.e., orientation layer) is preferably provided on the inner surface side (i.e., side facing the liquid crystal material) of at least one of the two substrates. More preferably, the orientation control film is provided on the inner surface side of each substrate.

In FIG. 1, an embodiment of the liquid crystal element wherein two orientation control films are provided is shown, and the orientation control films are indicated by 37a and 37b.

In the invention, the orientation control film is an organic or inorganic film such as polyimide, silicon oxide, polyvinyl alcohol, polyamide, polyester, etc., and particularly a polyimide film is preferable as the orientation control film. For example, when one orientation control film is provided in the element, the orientation control film is made of polyimide, and when two orientation films are provided in the element, at least one of them is made of polyimide, preferably both of them are made of polyimide.

Any polymers containing an imide bond can be employed as the polyimide for forming the orientation control film, and such polymers preferably have film-forming ability. Concrete examples of the polyimide include Upirex-R (trade name, available from Ube Industries, Ltd.), Sunever 130 (trade name, available from Nissan Kagaku Kogyo Co., Ltd.), Optomer Al-1251, JIA-28 (both: trade name, available from Japan Synthetic Rubber Co., Ltd.), Chelimide 601 (trade name, available from Mitsui Petrochemical Industries, Ltd.) and LX-1400, HL-1100 (both: trade name, available from Hitachi Kasei Kogyo Co., Ltd.). However, these examples are given by no means to restrict the polyimides employable in the invention.

As described above, polyimide is a resin containing as a host component a polymer having imide bond, but the orientation control film used in the invention may contain other resins than the polyimide or resins containing other recurring units than the imide recurring unit, provided that those resins do not mar properties of the polyimide.

When one of the orientation control films is formed from other material than polyimide, this orientation control is an organic material or an inorganic material.

Examples of the orientation control films formed from organic materials include films of resins such as polyvinyl alcohol, polyamideimide, polyester, polycarbonate, polyvinyl acetal, polyvinyl chloride, polyvinyl acetate, polyamide, polystyrene, cyloxane polyimide, cellulose resin, melamine resin, urea resin, acrylic resin and electroconductive polymer.

Further, the orientation control film may be a cured film of cyclized rubber type photoresist, phenolic novolac type photoresist or electron rays-photoresist (e.g., polymethyl methacrylate and epoxidized 1,4-polybutadiene).

The orientation control film may be formed from an inorganic material, and examples of the inorganic materials for forming the inorganic orientation control film include SiO, $SiO_2$, GeO, $Al_2O_3$, $Y_2O_5$, $ZrO_2$, $MgF_2$ and $CeF_3$.

The orientation control film can be formed by various method depending on the material used. For example, there can be employed a method of applying the resin as mentioned above on the inner surface of the substrate (i.e., surface facing the liquid crystal material) by spin coating and heating the coated layer of the resin, a method of bonding a resin film to the inner surface of the substrate, a method of coating a photosensitive resin thereon and curing the coated layer under application of energy rays, and a method of depositing an organic material thereon.

Further, the orientation control film (orientation layer) can be also formed by chemical adsorption of an organosilane coupling agent or a carboxylic acid multinuclear complex, or it can be formed by deposition of silicon oxide through a declined vapor deposition. Otherwise, the orientation layer can be also formed by coating a polyimide resin on the transparent electrode and then rubbing the coated resin in the predetermined direction.

The orientation layer may be so formed as to also have a function of a spacer which is described later.

Two of the transparent substrates 31a, 31b are arranged in such a manner that the two transparent electrodes 32a, 32b provided on the substrates face each other and a gap to be filled with a liquid crystal material is formed between the two substrates.

The width of the gap 34 (i.e., distance between the substrates) is usually in the range of 1 to 10 μm, preferably 1 to 5 μm. The gap can be easily formed, for example, by arranging the two substrates in such a manner that they hold a spacer therebetween.

The thickness of the orientation control film is generally in the range of 0,005 to 0.25 μm, preferably 0.01 to 0.15 μm.

In the invention, the orientation control film is provided on the inner side surface of the substrate as described above, and it is preferred that two of the orientation control films are arranged in such a manner that the orientation direction of the liquid crystal material determined by one orientation control film is almost parallel to the orientation direction of the liquid crystal material determined by the other orientation control film and that those directions are the same or opposite to each other. However, arrangement of the two orientation control films is by no means limited to this case.

The orientation control films 37a, 37b function to orientate the liquid crystal material. Accordingly, the same or opposite orientation directions of the liquid crystal material determined by the two orientation control films are better than a random arrangement of the direction. Thereby, the liquid crystal material introduced into the cell is enhanced in the initial orientation properties, and as a result, a liquid crystal element showing high contrast can be obtained.

The orientation control film has been preferably subjected to an orientation treatment. The term "orientation treatment" used herein means a treatment for orientating the liquid crystal molecules in the predetermined direction. For example, polyimide can be orientated by rubbing it with cloth in one direction.

As described above, the cell used in the invention has a gap 34 to be filled with the liquid crystal material between two substrates 31a, 31b which are provided, if desired, with orientation control films 37a, 37b. The gap 34 can be formed, for example, by arranging the substrates 31a, 31b holding a spacer 38 therebetween, as shown in FIG. 2. By the arrangement of the spacer 38, the gap 34 to be filled with the liquid crystal material can be formed without fail, and moreover the liquid crystal material can be prevented from leaking. The gap 34 can be formed not only by a sidewall having a specific thickness but also by adding particles having a specific particle diameter (i.e., internal spacer) to the liquid crystal material.

As the spacer, there can be employed, for example, a polyimide type polymer material obtained by patterning a photosensitive polyimide precursor. By virtue of using such a spacer as mentioned above, a monodomain is formed by interfacial effect between the spacer and the liquid crystal material. An orientation film and a spacer can be integrated into one system, for example, by using a concentric spacer or a comb-like spacer which also acts as an orientation film.

Instead of using such a spacer as mentioned above, fibers can be added to the liquid crystal material, and thereby the transparent substrates can be held to form a gap having a constant width.

Furthermore, granular particles may also be used in place of or together with the above-mentioned fibers.

The particles as referred to above include those composed of melamine resin, urea resin or benzoguanamine resin having a particle diameter of 1 to 10 μm, preferably 1 to 5 μm, more preferably 1.6 to 5 μm.

The two transparent substrates so arranged as to form a gap therebetween using a spacer, etc. are then generally sealed with a sealing material 36 along their peripheries to be bonded.

Examples of the sealing material 36 include epoxy resin, UV curable resin and silicone resin, and they may be modified with acrylic rubber, silicone rubber, etc.

In the liquid crystal element of the invention, a variety of thin films such as a photoconductive film, a light screening film and a light reflecting film can be provided between the orientation control film and the substrate.

In the liquid crystal element of the invention, a liquid crystal material, that is, the aforementioned liquid crystal composition 35, is filled in the gap 34 of the cell.

The liquid crystal element of the invention is remarkably improved in its properties such as contrast, and it can be favorably used, for example, as a surface stabilized ferroelectric liquid crystal element, a surface stabilized antiferroelectric liquid crystal element, a helically modulated element, an overly scattered element, a guest-host element, a vertically orientated liquid crystal element.

In a liquid crystal element containing a liquid crystal composition exhibiting antiferroelectricity, such as the liquid crystal element of the invention, the element is beforehand so arranged as to be in a dark state, and a triangular wave voltage of low frequency is applied to the element. Through observation of the liquid crystal element using a polarization microscope, there is found such a double hysteresis curve that the amount of the transmitted light becomes the minimum value (i.e., dark state) when the voltage is 0 (V/μm) and it becomes the maximum value (i.e., bright state) when the applied voltage is +Va (V/μm) and −Va (V/μm). Therefore, an optional bias voltage Vb (0<Vb<+Va (V/μm)) between 0 and +Va (V/μm) is initially applied to the element, and then an appropriate pulse wave is piled on the bias voltage and applied to the element, whereby the amount of a light transmitted by the liquid crystal element can be changed from the bright state to the dark state. By driving the antiferroelectric liquid crystal element in this manner, the element can be much more enhanced in the apparent memory properties as compared with the liquid crystal element utilizing ferroelectricity.

Among the liquid crystal elements of the invention, a liquid crystal element filled with the liquid crystal composition in a chiral smectic C phase can be used as a storage type liquid crystal display element such as a thermal write type liquid crystal display element and a laser write type liquid crystal display element. Using these liquid crystal elements, various liquid crystal display devices and electrooptic display devices can be produced.

Furthermore, the liquid crystal elements of the invention can be also used as optically switching elements such as optical shutters or liquid crystal printers, piezoelectric elements and pyroelectric elements. Using these liquid crystal elements, various liquid crystal display devices and electrooptic display devices can be produced.

The liquid crystal element of the invention can be driven, for example, by methods described below.

The liquid crystal composition of the invention is orientated in parallel to the substrates in the cell utilizing a control power of the substrates. The cell is placed between two polarizing plates, and an external voltage is applied to the liquid crystal element in the aforementioned manner. As a result, the orientation vector of the antiferroelectric liquid crystal composition is changed, and this change of the orientation vector produces birefringence of the liquid crystal composition. That is, this method is a display method utilizing polarization of the two polarizing plates and the birefringence. In this method, the liquid crystal composition is allowed to produce antiferroelectricity in the cell and reversed in the electric field between two stable states, to conduct optical switching.

Moreover, such antiferroelectric liquid crystal material as mentioned above shows apparent memory effect when a fixed bias voltage is initially applied to the liquid crystal material and then an appropriate pulse wave is further applied thereto in addition to the bias voltage.

Accordingly, utilizing this memory effect, the liquid crystal element can be driven under application of an optional bias voltage to the element. Further, when a display device is produced using the liquid crystal element, the obtained display device can be remarkably enhanced in contrast, and a liquid crystal display such as a displayed image becomes very sharp. Furthermore, the contrast of the display device is stable and extremely sharp.

In the switching element containing the liquid crystal composition of the invention, switching operation can be performed by only altering the orientation direction of the molecule. In this case, the first term of the electric field applied to the switching element acts on driving of the element, and therefore the element can be driven at a low voltage.

The switching element realizes a high speed response of not longer than several tens of microseconds, and as a result significantly shorten the operation time thereof. Accordingly, a display device (liquid crystal display device) having a large screen with many scanning lines can be easily produced by using the liquid crystal element. The display device can be driven at room temperature or at a temperature not higher than room temperature, and therefore the device can be driven without auxiliary means for controlling the driving temperature.

Furthermore, in the liquid crystal material used for the liquid crystal element of the invention, the molecules of the material are inducibly orientated when an electric field is applied even in a smectic A phase where the molecules are generally considered not to exhibit tristability. Optical switching can be conducted by utilizing this property.

A second display method of the liquid crystal composition according to the invention is a method in which the liquid crystal composition of the invention and a dichroic dye are used, and which utilizes dichroism of the dye. In this method, display is achieved by changing the orientation direction of the ferroelectric or antiferroelectric liquid crystal composition to change a light absorption wavelength of the dye. The dye used herein is usually a dichroic dye, and examples of the dichroic dye include azo dyes, naphthoquinone dyes, cyanine dyes and anthraquinone dyes.

The liquid crystal composition of the invention can be also employed in other various display methods conventionally used than the above-mentioned methods.

The display devices produced using the liquid crystal composition of the invention can be driven by electric address display system such as static driving, simple matrix driving and composite matrix driving, optically address display system, thermal address display system and electron beam display system.

Process for Preparing Liquid Crystal Element

A process for preparing such liquid crystal element as mentioned above will be described below.

The liquid crystal element of the invention can be basically prepared by filling a gap of the above-mentioned cell with a liquid crystal material containing the above-mentioned liquid crystal composition.

In detail, the liquid crystal material is usually heated until it becomes in a molten state, and filled (poured) into the gap of the cell kept at a reduced pressure while being molten. After the liquid crystal material is filled in the gap, the cell is usually sealed. Then, the liquid crystal material filled in the gap of the cell is subjected to an initial orientation.

For conducting the initial orientation of the liquid crystal material, the cell having been sealed as above is heated until a temperature of the liquid crystal material filled in the cell becomes not lower than the temperature where it begins to show an isotropic phase, and cooled to a temperature where the liquid crystal material shows a liquid crystal phase. In this cooling, the cooling rate is preferably not more than 2° C./min, more preferably in the range of 0.1° to 2.0° C./min, most preferably in the range of 0.1° to 0.5° C./min. When the cell is cooled at such a cooling rate as mentioned above, the liquid crystal material is improved in the initial orientation, and hence there can be obtained a liquid crystal element having a liquid crystal phase free from orientation defects and composed of a monodomain. The term "initial orientation" designates an arranged state of a liquid crystal material before changing the orientation vector of the liquid crystal material by applying an electric voltage, etc. to the liquid crystal element.

The liquid crystal material filled in the gap of the liquid crystal cell can be orientated, for example, by a temperature gradient method using a spacer edge or a monoaxial orientation control method such as a surface treatment with an orientation film. In the present invention, the initial orientation of the liquid crystal material can be also conducted by applying an electric field formed as the result of applying a direct current bias voltage to the liquid crystal material while the crystal material is heated.

EFFECT OF THE INVENTION

By virtue of using the liquid crystal composition of the invention which comprises both the antiferroelectric liquid crystal and the cholesteric liquid crystal as described above, there can be obtained a liquid crystal element having high orientation properties (high contrast).

Further, in a liquid crystal display device produced using the liquid crystal element, an operation time can be markedly shortened, a power consumption can be reduced, and a stable contrast can be obtained. Moreover, driving at a low voltage is possible.

The devices produced using the liquid crystal composition of the invention utilize antiferroelectric properties, so that they can be favorably employed for optical switching system driven at room temperature or a temperature not higher than room temperature. Further, a liquid crystal element comprising the liquid crystal composition is excellent in the memory properties and can be easily prepared. The liquid crystal composition of the invention can be remarkably enhanced in the orientation properties as compared with the conventional liquid crystal compositions.

Examples of the present invention are given below, but the invention is in no way limited to the examples.

In the examples, R and S mean an R structure of optically isomer and an S structure of optically isomer, respectively.

At first, synthesis examples of the antiferroelectric liquid crystal compounds are given below.

Synthesis Example 1

Synthesis of R-1'''trifluoromethylheptyl 4-[4'-(5'',6'',7'',8''-tetrahydro-6''-n-decyloxy benzoate

First step 328 mg (1.0 mmol) of 6-n-decyloxynaphthalene-2-carboxylic acid and 0.1 g of 5% palladium/carbon were added to 10 ml of tetrahydrofuran, and the resulting mixture was stirred in a hydrogen atmosphere at 120° C. and 25 atm.

The temperature and the pressure of the reaction system were returned to normal temperature and normal pressure, and the reaction mixture was then filtrated with celite (filter aid). The filtrate was concentrated to obtain a solid, and the solid was recrystallized with hexane to obtain 90 mg (0.27 mmol) of 5,6,7,8-tetrahydro-6-n-decyloxynaphthalene-2-carboxylic acid as a white solid.

Second step

To a mixture of 9.20 g (50 mmol) of R-1-trifluoromethyl heptanol, 11.40 g (50 mmol) of 4-benzyloxybenzoic acid, 0.61 g (5 mmol) of 4-N,N-dimethylaminopyridine and 100 ml of methylene chloride was dropwise added 70 ml of a methylene chloride solution containing 11.33 g (55 mmol) of N,N-dicyclohexylcarbodiimide at room temperature with stirring over a period of 2.5 hours.

The resultant mixture was allowed to react at room temperature for 4 hours.

Then, the reaction mixture was filtered, and the filtrate was concentrated. The concentrate was separated using column chromatography to obtain 15.96 g (40.6 mmol) of R-1'-trifluoromethylhexyl 4-benzyloxybenzoate as a white solid.

Third step

Into a mixture of 15.96 g (40.6 mmol) R-1'-trifluoromethylhexyl 4-benzyloxybenzoate obtained in the second step, 1.6 g of 5% palladium/carbon and 80 g of tetrahydrofuran was blown hydrogen over a period of 8 hours at room temperature and normal pressure with stirring of the mixture. The reaction mixture was filtrated with celite (filter aid), and the filtrate was concentrated to obtain 12.34 g (40.6 mmol) of R-1'-trifluoromethylhexyl 4-hydroxybenzoate as a white solid.

Fourth step

To a mixture of 12.34 g (40.6 mmol) of R-1'-trifluoromethylhexyl 4-hydroxybenzoate obtained in the third step, 9.26 g (40.6 mmol) of 4-hydroxybenzylbenzoate, 0.49 g (4 mmol) of 4-N,N-dimethylaminopyridine and 80 ml of methylene chloride was dropwise added 50 ml of a methylene chloride solution containing 9.2 g (44.7 mmol) of N,N-dicyclohexylcarbodiimide at room temperature with stirring over a period of 2 hours.

The resultant mixture was allowed to react at room temperature for 3.5 hours.

Then, the reaction mixture was filtered, and the filtrate was concentrated. The concentrate was separated using column chromatography to obtain 19.64 g (38.2 mmol) of R-1'-trifluoromethylhexyl 4-(4'-benzyloxybenzoyloxy)benzoate as a white solid.

Fifth step

Into a mixture of 19.64 g (38.2 mmol) of R-1'-trifluoromethylhexyl 4-(4'-benzyloxybenzoyloxy) benzoate obtained in the fourth step, 3.0 g of 5% palladium/carbon and 100 g of tetrahydrofuran was blown hydrogen over a period of 14 hours at room temperature and normal pressure with stirring of the mixture. The reaction mixture was filtrated with celite (filter aid), and the filtrate was concentrated to obtain 6.29 g (38.2 mmol) of R-1'-trifluoromethylhexyl 4-(4'-hydroxybenzoyloxy)-benzoate as a white solid.

Sixth step

To a mixture of 0.332 g (1.0 mmol) of 5,6,7,8-tetrahydro-6-n-decyloxynaphthalene-2-carboxylic acid obtained in the first step, 0.424 g (1.0 mmol) of R-1'-trifluoromethylhexyl 4-(4'-hydroxybenzoyloxy)benzoate obtained in the fifth step, 0.012 g (0.1 mmol) of 4-N,N-dimethylaminopyridine and 25 ml of methylene chloride was dropwise added 10 ml of a methylene chloride solution containing 0.247 g (1.2 mmol) of N,N'-dicyclohexylcarbodiimide at room temperature with stirring over a period of 2.5 hours. The resultant mixture was allowed to react at room temperature for 2 hours.

The reaction mixture was filtrated, and the filtrate was concentrated. The concentrate was separated using column chromatography to obtain 0.23 g of a white solid.

The M/e value of FD-mass spectrum on the white solid was 738.

From the results of the analyses, the compound was identified to be R-1'''trifluoromethylheptyl 4-[4'-(5'',6'',7'',8''-tetrahydro-6''-n-decyloxy-2''-naphthoyloxy)benzyloxy]benzoate which was the aimed compound.

When the liquid crystal temperature range of the compound was measured, the compound was in a $SmC_A^*$ phase (antiferroelectric phase) between 79° C. and 64° C., and it was in a SmA phase between 64° C. and 47° C.

Each phase transition temperature was determined based on DSC measurement and phase observation using a polarization microscope. Further, whether the compound is ferroelectric or antiferroelectric was judged based on the phase observation, hysteresis form of the transmitted light and selection reflection.

Judgement based on the phase observation was made as follows.

The crystal element is so arranged that it is in a dark state using a polarization microscope. To the liquid crystal element were applied a voltage of $+30$ V/$\mu$m and a voltage of $-30$ V/$\mu$m. If the liquid crystal element becomes a bright state in each case, the compound is antiferroelectric.

Judgement based on the hysteresis form of the transmitted light was made as follows.

The crystal element is so arranged that it is in a dark state using a polarization microscope. To the liquid crystal element is applied a triangular wave between $+30$ V/$\mu$m and $-30$ V/$\mu$m at 0.1 Hz or 0.01 Hz, and the amount of a light transmitted by the liquid crystal element is monitored. If the hysteresis form of the transmitted light is a double hysteresis form, the compound is antiferroelectric.

Judgement based on the selection reflection was made as follows.

The compound is treated with a silane coupling agent to prepare a homeotropic liquid crystal element. A light is irradiated onto the liquid crystal element at an incidence angle of 30°, and a spectrum of the transmitted light is measured. If the spectrum shows a single trough, the compound is antiferroelectric.

Synthesis Example 2

Synthesis of R-1''-trifluoromethylheptyl 4-(5',6',7',8'-tetrahydro-6'-n-decyloxy-2'-naphthoyloxy)benzoate To a mixture of 0.332 g (1.0 mmol) of 5,6,7,8-tetrahydro-6-n-decyloxynaphthalene-2-carboxylic acid obtained in the first step of Synthesis Example 1, 0.304 g (1.0 mmol) of R-1'-trifluoromethylhexyl 4-hydroxybenzoate, 0.012 g (0.1 mmol) of 4-N,N-dimethylaminopyridine and 25 ml of methylene chloride was added dropwise 10 ml of a methylene chloride solution containing 0.247 g (1.2 mmol) of N,N'-dicyclohexylcarbodiimide at room temperature with stirring over a period of 1.5 hours. Then, the reaction mixture was filtrated, and the filtrate was concentrated. The concentrate was separated using column chromatography, to obtain 0.30 g of a white solid. The M/e value of FD-mass spectrum on the white solid was 618.

$^1$H-NMR spectrum on this compound was measured.

From the results of the analyses, the compound was identified to be R-1''-trifluoromethylheptyl 4-(5',6',7',8'-tetrahydro-6'-n-decyloxy-2'-naphthoyloxy) benzoate which was the aimed compound.

Example 1

10% by weight of the antiferroelectric liquid crystal compound [A] represented by Compound No. [A-8] obtained by the above Synthesis Example 1 or 2 was mixed with 90% by weight of the cholesteric liquid crystal compound [B] represented by Compound No. [B-1], to prepare a liquid crystal composition of the invention.

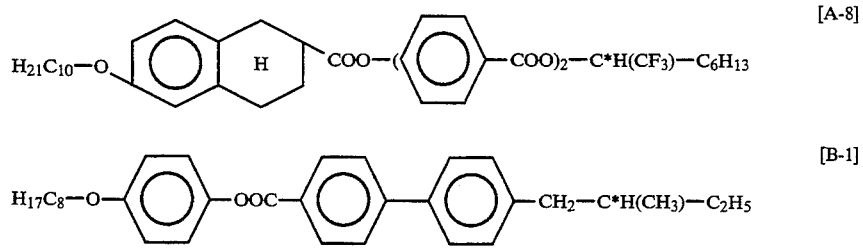

The phase transition temperatures of the obtained composition were measured.

The results are set forth in Table 4.

In Table 4, phase transition temperatures of the compounds represented by Compound No. [A-8] and Compound No. [B-1] (also referred to simply as "compound [A-8]" and "compound [B-1]", respectively, and the same can be mentioned also in other compounds) are also set forth.

TABLE 4

| Compound No. | Phase Transition Temperature | | | |
|---|---|---|---|---|
| | Cry—$SmC_A^*$ or Cry—SmA | $SmC_A^*$—SmA | $SmC_A^*$—Ch or SmA—Ch | SmA—Iso or Ch—Iso |
| [A-8] | 44° C. | 78° C. | | 94° C. |
| [A-8] (10 wt. %) + [B-1] (90 wt. %) | 40° C. | 69° C. | 80° C. | 149° C. |
| [B-1] | 76° C. | | 89° C. | 155° C. |

Example 2

The liquid crystal composition obtained in Example 1 was filled in the cell shown in FIG. 1, to prepare a liquid crystal element.

The operation temperature range of the obtained liquid crystal element was between 44° C. and 149° C., and in this temperature range the liquid crystal element showed stable contrast.

The liquid crystal element was prepared as follows.

The liquid crystal composition set forth in Table 4 (compound [A-8]+compound [B-1]) was melted by heating, and introduced into the gap kept at a reduced pressure of a cell which was composed of two transparent substrate having ITO (Indium Tin Oxide) and two orientation control films (each thickness: 150 Å) each formed on each inner side of the substrates, as schematically and sectionally shown in FIG. 1, the orientation control films being made of polyimide (Optomer AL1251, available from Japan Synthetic Rubber Co., Ltd.), and rubbed in such a manner that the orientation directions become almost parallel to each other and in the same direction.

After the liquid crystal composition was filled in the gap of the cell as described above, the cell was heated to 150° C., held at 150° C. for 5 minutes, and cooled to 60° C. at a rate of 1° C./min, to obtain a liquid crystal element.

Thus obtained liquid crystal element showed a contrast of 50.

The cell condition is as follows:
(a) External size: 2.5 cm long×2.2 cm wide×1.5 cm thick
(b) Substrate: 0.7 mm thick, composed of glass
(c) Distance between substrates: 2 μm
(d) Sidewall size: 1.8 mm long×0.1 cm wide×2 μm thick The above-mentioned cell used for evaluation of the liquid crystal was prepared in the following manner.

A glass substrate having an ITO transparent electrode film thereon was coated with polyimide. That is to say, the ITO transparent electrode film was coated with polyimide (Optomer AL1251, available from Japan Synthetic Rubber Co., Ltd.) by spin coating.

In detail, the polyimide was coated on the electrode film by means of spin coating method at 2000 r.p.m., and cured by heating at 180° C. for 1 hour to form a polyimide film having a thickness of 300 to 400 Å. The polyimide film was then rubbed with a nylon cloth in one direction, thereby imparting a liquid crystal orientation ability thereto.

Two of the polyimide film-coated glass substrates prepared as above were used to form a cell. That is, an epoxy adhesive was applied onto one of the polyimide film-coated glass substrates by means of silk screen printing in order to bond the two substrates together and to control the gap of the cell. The epoxy adhesive was prepared by mixing an adhesive base (LCB-304B, available from EHC Co., Ltd.) with a curing agent (LCB-310B, available from EHC Co., Ltd.) and beads (GP-20, available from EHC Co., Ltd.) for controlling the cell gap in the proportion of 130:30:3.

The two substrates were stacked in such a manner that the polyimide films of the substrates faced each other. The coated epoxy adhesive was cured by stepwise heating at 50° C. for 15 minutes, 60° C. for 15 minutes, 70° C. for 15 minutes, 80° C. for 15 minutes, 125° C. for 15 minutes and 170° C. for 60 minutes to bond the substrates together.

Using thus prepared cell having a gap of about 2 μm, the properties of the liquid crystal were evaluated.

The measurement of contrast in the invention was conducted as follows. The liquid crystal element was placed between two polarizers whose polarizing planes met at right angles, and the liquid crystal element was rotated. The intensity I of the transmitted light in the bright state and dark state obtained by the rotation of the liquid crystal element was measured, and the contrast was determined from a ratio of I (bright state) / I (dark state).

Comparison Example 1

The procedure of Example 2 was repeated except for using only the antiferroelectric liquid crystal compound [A-8] but not using the cholesteric liquid crystal compound [B-1], to obtain a liquid crystal element.

The obtained liquid crystal element was evaluated on the contrast in the above-mentioned manner. As a result, the contrast of the liquid crystal element was 20.

Examples 3–6

The procedure of Example 2 was repeated except for varying the amounts (wt.%) of the antiferroelectric liquid crystal compound [A-8] and the cholesteric liquid crystal compound [B-1] to those set forth in Table 5, to obtain liquid crystal elements.

The obtained liquid crystal elements were evaluated on the contrast in the above-mentioned manner.

The results are set forth in Table 5.

TABLE 5

| | Compound | | Phase Transition Temperature (°C.) | | | | |
| | [A-8] (wt. %) | [B-1] (wt. %) | Cry—SmC$_A$* or Cry—SmA | SmC$_A$*—SmA | SmC$_A$*—Ch or SmA—Ch | SmA—Iso or Ch—Iso | Contrast (60° C.) |
|---|---|---|---|---|---|---|---|
| Ex. 3 | 25 | 75 | 41 | 67 | | 145 | 119 |
| Ex. 4 | 50 | 50 | 42 | 97 | | 146 | 325 |
| Ex. 5 | 75 | 25 | 35 | 83 | | 136 | 98 |
| Ex. 6 | 90 | 10 | 45 | 80 | | 110 | 70 |

Examples 7–9

The procedure of Example 2 was repeated except for using the antiferroelectric liquid crystal compound [A-8] in the amounts set forth in Table 6, and using the cholesteric liquid crystal compounds [B-2], [B-3] and [B-4] in the amounts set forth in Table 6 instead of the cholesteric liquid crystal element [B-1], to obtain liquid crystal elements.

The obtained liquid crystal elements were evaluated on the contrast in the above-mentioned manner.

The results are set forth in Table 6.

TABLE 6

| Compound (wt. %) | Phase Transition Temperature (°C.) | | | Contrast |
|---|---|---|---|---|
| | Cry—SmC$_A$* or Cry—SmA | SmC$_A$*—SmA | SmA—Iso | |
| Ex. 7 [A-8] (26%) + [B-2] (74%) | 62 | | 108 | 25 (70° C.) |
| Ex. 8 [A-8] (25%) + [B-3] (75%) | 36 | 54 | 77 | 19 (50° C.) |
| Ex. 9 [A-8] (24%) + [B-4] (76%) | 41 | 60 | 82 | 21 (50° C.) |

Note: In the above table, the compounds [B-2], [B-3] and [B-4] are represented by the following formulas.

$$H_{21}C_{10}O-\bigcirc-O-CO-\bigcirc\bigcirc-COO-CH_2-C^*H(CH_3)-C_2H_5 \quad [B-2]$$

$$H_{15}C_7-O-\bigcirc-O-CO-\bigcirc-O-C_3H_6-C^*H(CH_3)-C_2H_5 \quad [B-3]$$

$$H_{21}C_{10}O-\bigcirc-COO-\bigcirc-O-C_3H_6-C^*H(CH_3)-C_2H_5 \quad [B-4]$$

What is claimed is:

1. A liquid crystal composition comprising at least one compound exhibiting an antiferroelectric phase and at least one compound exhibiting a cholesteric phase, wherein the at least one compound exhibiting an antiferroelectric phase is a carboxylic acid ester represented by the following formula (A):

$$R_1-B_1-A_1-B_2-A_2-B_3-A_3-\overset{O}{\underset{}{C}}-O-\overset{R}{\underset{H}{C^*}}-(CH_2)_n R_2 \quad (A)$$

wherein $R_1$ is an alkyl group of 3 to 20 carbon atoms or a halogenated alkyl group of 3 to 20 carbon atoms;
$R_2$ is an alkyl group of 1 to 20 carbon atoms;
R is a methyl group or trifluoromethyl group;
$B_1$ represents a single bond or —O—,
$B_2$ represents —COO—, or —CH$_2$CH$_2$—;
$B_3$ represents a single bond, —COO—, or —(CH$_2$)$_2$—;
$A_1$ and $A_2$, each, independently, represent a ring structure selected from the group consisting of

[ring structures: phenyl, biphenyl, phenyl-cyclohexyl, naphthyl, decalinyl, tetrahydronaphthyl]

which may be substituted by halogen atom or a lower alkyl group,
when $B_3$ represents a single bond, $A_3$ represents a single bond, and when $B_3$ represents —COO— or —CH$_2$—CH$_2$—, $A_3$ is

[phenyl ring], provided that at least one of $A_1$ and $A_2$ represent the following ring structures

[tetrahydronaphthyl or tetrahydronaphthyl ring structures] (1)

which may be substituted by halogen atom or a lower alkyl group; and
n is an integer of 0 to 4; and
the compound exhibiting a cholesteric phase is a compound represented by the following formula (B)

$$R_3-B_6-\bigcirc-B_8-A_5-B_9-(CH_2)_m\overset{CH_3}{\underset{H}{C^*}}-R_4 \quad (B)$$

wherein $R_3$ is an alkyl group of 3 to 20 carbon atoms or a halogenated alkyl group of 3 to 20 carbon atoms;
$R_4$ represents an alkyl group of 2 to 5 carbon atoms;
$B_6$ represents —O—;
$B_8$ represents —COO— or —OCO—;
$B_9$ represents —COO—, —O— or a single bond;
$A_5$ represents a ring structure selected from the group consisting of

[phenyl, biphenyl, and naphthyl ring structures] (2)

m is an integer of 1 to 3.

2. The liquid crystal composition as claimed in claim 1, wherein in formula (A) $R_1$ is an alkyl group of 7-16 carbon atoms, $R_2$ is an alky group of 2-6 carbon atoms, $B_3$ is a single bond or —COO—, $A_1$ is one of said ring structures

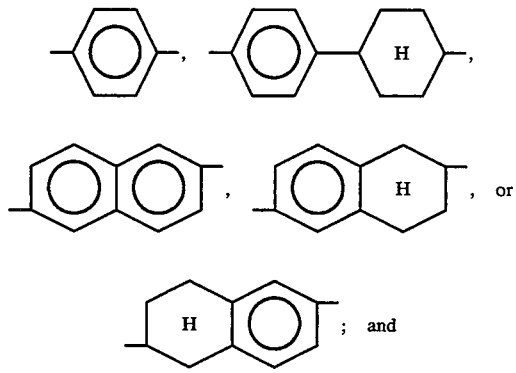

$A_2$ is one of said ring structures

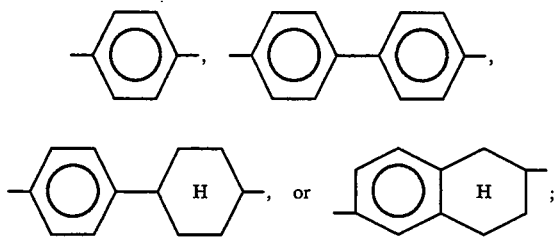

and n is 0.

3. The liquid crystal composition of claim 2, wherein in the formula (A) $R_1$ is n-decyl group, $R_2$ is n-hexyl group, $B_1$ is —O— $A_1$ is

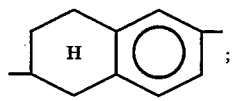

$B_2$ is —COO—; $A_2$ is

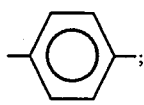

R is trifluoromethyl group and n is 0; and in the formula (B) $R_3$ is an alkyl group of 7-10 carbon atoms; and $R_4$ is an alkyl group of 2 carbon atoms.

4. The liquid crystal composition of claim 1, wherein in formula (A) $B_1$ represents —O— or a single bond; $A_1$ represents

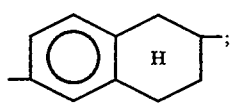

$A_2$ and $A_3$ each represent

$B_2$ and $B_3$ each represent —COO—; and n is 0.

5. A liquid crystal element comprising a cell which includes two substrates facing each other and having a gap therebetween, said gap being filled with a liquid crystal material, wherein the liquid crystal material is the liquid crystal composition as claimed in any one of claims 1, 2, 4 or 3.

6. An electrooptic device using the liquid crystal element as claimed in claim 5.

7. An optically modulation element using the liquid crystal element as claimed in claim 5.

8. A process for the preparation of a liquid crystal element comprising a cell which has two substrates facing each other and having a gap therebetween, said gap being filled with a liquid crystal material as set forth in claim 8, which comprises the steps of forming a cell provided with an orientation control film on the inner side surface of at least one of the substrates, filling the gap of the cell with said liquid crystal material, heating the cell to a temperature not lower than the temperature at which the liquid crystal material filled in the gap of the cell becomes an isotropic phase, and then cooling the cell to a temperature not higher than the temperature at which the liquid crystal material becomes a liquid crystal phase.

9. The process for the preparation of a liquid crystal element as claimed in claim 8, wherein the cell is heated to a temperature not lower than the temperature at which the liquid crystal material becomes an isotropic phase, and then cooled to a temperature not higher than the temperature at which the liquid crystal material becomes a liquid crystal phase at a cooling rate of not more than 2° C./min.

10. The liquid crystal composition as claimed in any one of claims 13, 14, 4 or 3, which comprises from 1 to 99 parts by weight of the compound formula (A) and 99 to 1 parts by weight, of the compound formula (B), per 100 parts by weight of the composition.

11. The liquid crystal composition of claim 1, wherein in formula (A) $R_1$ is a straight chain alkyl group of 6 to 16 carbon atoms or a halogenated straight chain alkyl group of 6 to 16 carbon atoms; and $R_2$ is an alkyl group of 1 to 10 carbon atoms; and in the compound of formula (B) $R_3$ is an alkyl group of 6 to 18 carbon atoms or a halogenated alkyl group of 6 to 18 carbon atoms.

12. The liquid crystal composition of claim 1, which comprises from 15 to 85 parts by weight of the compound of formula (A) and from 15 to 85 parts by weight of the compound of formula (B), per 100 parts by weight of the liquid crystal composition.

13. The liquid crystal composition of claim 1, which is a homogeneous mixture comprising at least one antiferroelectric liquid crystal compound of formula (A) and at least one cholesteric liquid crystal compound of formula (B) and wherein the composition exhibits a phase change of isotropic phase to cholesteric phase to smectic A phase to antiferroelectric phase at progressively lower temperature.

14. The liquid crystal composition of claim 1, which comprises a mixture of the following compound (A-8) and the following compound (B-1)

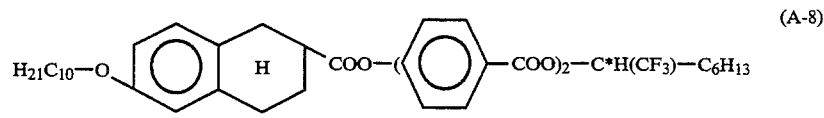 (A-8)
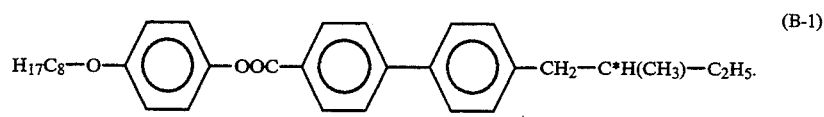 (B-1)
* * * * *